E. WHALLEY.
TRUCK.
APPLICATION FILED MAR. 6, 1914.
1,138,337.
Patented May 4, 1915.
2 SHEETS—SHEET 1.
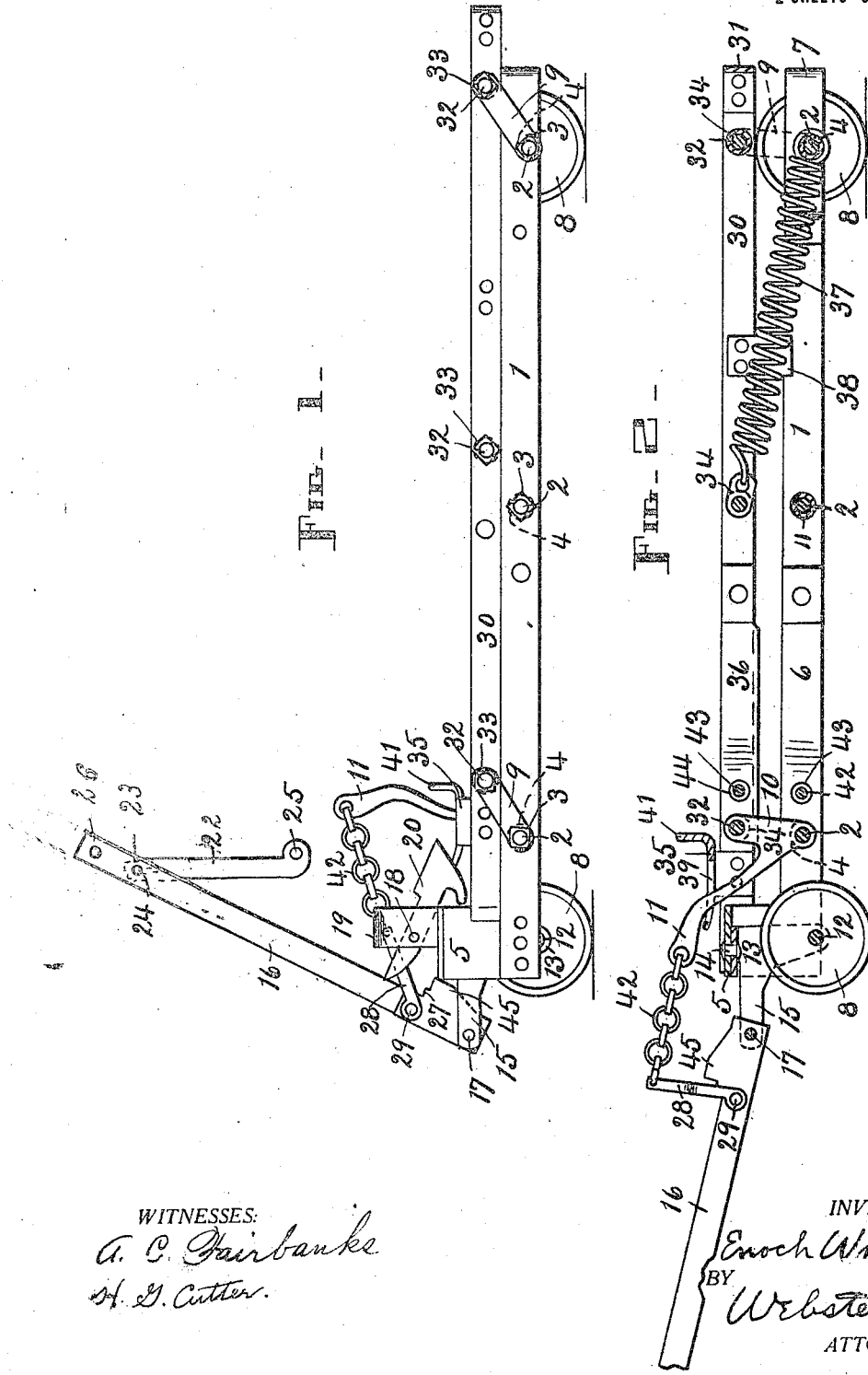
WITNESSES:
A. C. Fairbanks
H. G. Cutter
INVENTOR
Enoch Whalley,
BY Webster & Co.
ATTORNEYS.

E. WHALLEY.
TRUCK.
APPLICATION FILED MAR. 6, 1914.
1,138,337.
Patented May 4, 1915.
2 SHEETS—SHEET 2.
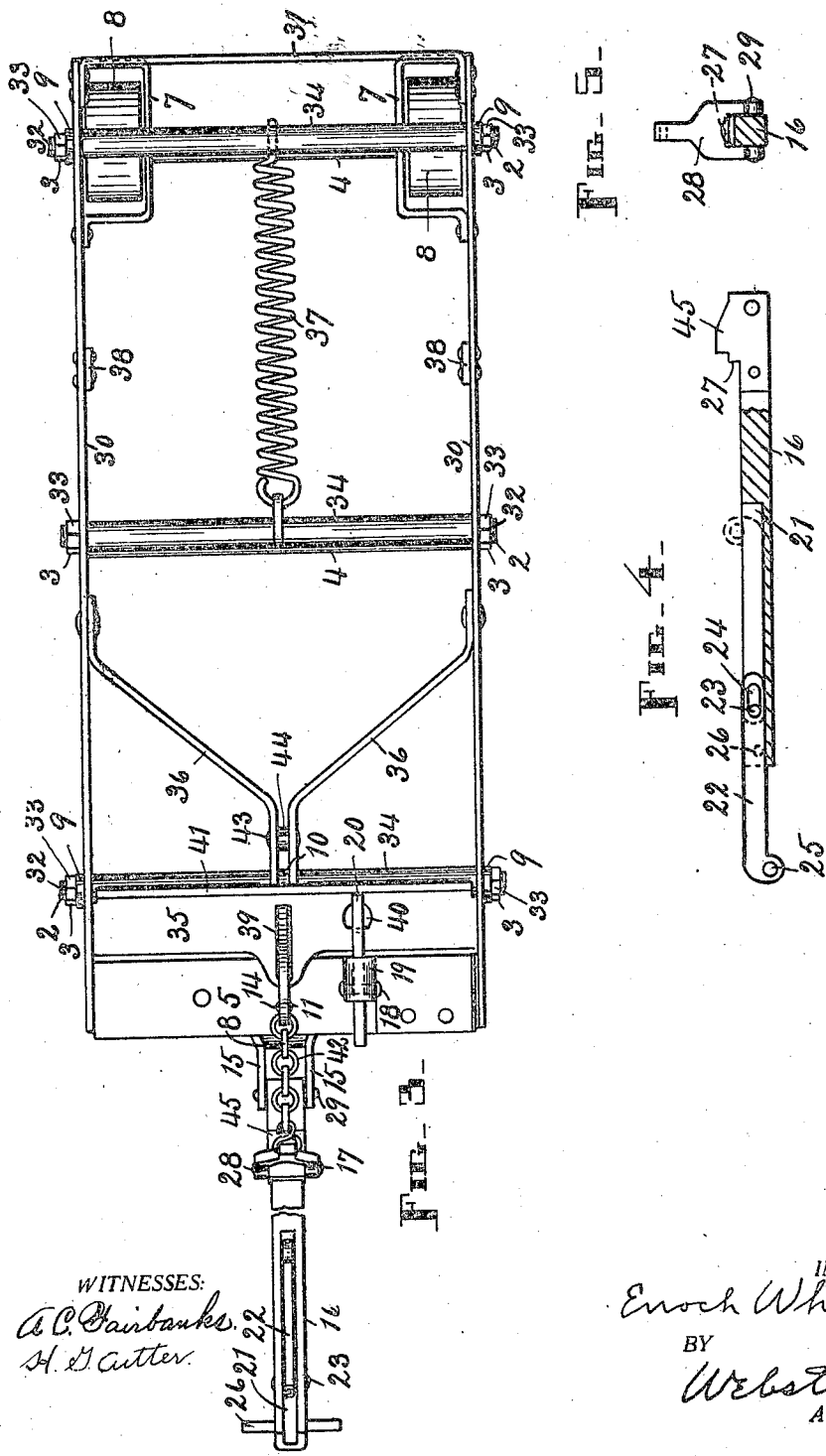
WITNESSES:
A. C. Fairbanks.
H. G. Cutter.
INVENTOR.
Enoch Whalley,
BY
Webster & Co.,
ATTORNEYS.

UNITED STATES PATENT OFFICE.

ENOCH WHALLEY, OF WILLIMANSETT, MASSACHUSETTS.

TRUCK.

1,138,337. Specification of Letters Patent. Patented May 4, 1915.

Application filed March 6, 1914. Serial No. 822,967.

*To all whom it may concern:*

Be it known that I, ENOCH WHALLEY, a citizen of the United States of America, residing at Willimansett, in the county of Hampden and State of Massachusetts, have invented a new and useful Truck, of which the following is a specification.

My invention relates to improvements in trucks, and more especially to trucks such as are used in factories, warehouses, stores, and other places to haul goods or materials from one point to another by hand, and to such trucks in which the construction is of a nature whereby a horizontal movement is converted into a vertical movement, and said invention resides in a certain peculiar construction of the framework of the truck and in certain peculiar means or mechanism, operated by the handle or tongue of the truck, for moving the upper truck section in relation to the under truck section, or vice versa, such means or mechanism consisting in part of an equalizer and an extensible handle or tongue, all as hereinafter set forth.

The objects of my invention are, first, to produce an elevating truck for use in raising goods or material from the support therefor, or with such support, from the floor, hauling said goods or material to the desired place, and then depositing the same, whereby a large saving in time, labor, and expense is effected; second, to produce a truck of this kind and for this purpose which is comparatively simple, both in construction and operation, consisting as it does of few parts, light and inexpensive, and, at the same time, very strong and durable; third, to provide such a truck with an equalizing factor by means of which the raising and lowering operations are easily and quickly performed under conditions which require the putting forth of an approximately uniform amount of force on the part of the operation, from start to finish, or, in other words, the load, in being elevated, is started slowly and with the minimum expenditure of force, and then, as said load continues to rise, the same force is in part absorbed as it were in the increased speed with which said load moves, so that such minimum expenditure is continuous, and, inversely, the same thing is true of the same action or kind of action takes places when the load is lowered, all of which gives full and complete control of the load into the hands of the operator, and, fourth, to provide a truck of this type with supplementary or auxiliary leverage, for the handling of loads of unusual weight, and with ample and adequate facilities for initially starting the load downward.

This truck is capable of handling a great weight, and it is also sufficiently low, when the upper section is depressed, to be operated in connection with a stock of goods or material that is supported close to the floor. This last is a desirable feature, because it is desirable to pile or stack the goods or material, which the truck is designed to handle, with as little space between the bottom of the same and the floor as is practicable. Yet, withal, the truck has a sufficient range of elevation.

Other objects and advantages will appear in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views; Figure 1 is a side elevation of a truck which embodies my invention as aforesaid, the upper truck section being depressed and the operating parts or mechanism disposed accordingly; Fig. 2, a central longitudinal vertical section through said truck, said section being here raised and the operating parts correspondingly disposed; Fig. 3, a top plan of said truck, with the parts and members disposed as in Fig. 2; Fig. 4, a detail in section of the extensible tongue or handle, and, Fig. 5, a cross-section through said handle, taken just above or forward of the stop shoulder with which said handle is provided, and showing the attached equalizer member. The front end portion of the tongue is broken off in Fig. 1, and a portion of said tongue is broken out in Fig. 3.

This truck comprises an under section or body mounted on rolls or wheels, a superimposed or upper section or platform arranged to move longitudinally or horizontally and vertically relative to said body, and means for so moving said platform when the tongue of the truck is swung up and down on its pivot, provided there be no load on the truck; when the truck is loaded, however, the lower section instead of the upper section is the one that usually moves longitudinally, as will subsequently be more fully explained.

The body consists of two side pieces 1, three tie-rods 2 secured by nuts 3 and provided with spacer sleeves 4, a raised plate 5 having its depending ends rigidly secured to said side pieces at their front terminals, and braces 6—6 having their rear ends rigidly attached to said side pieces and their front ends connected with the foremost tie-rod. The rear terminal portions of the side pieces 1 are bent inwardly and rigidly attached at their ends to the inside of said side pieces to form angular brackets 7, through which the rearmost tie-rod 2 extends, and within each of which is a roll or wheel 8, said wheel being mounted on said tie-rod. The rearmost spacer sleeve 4 is between the brackets 7, and mounted on the protruding terminals of the rearmost tie-rod 2 is a pair of links 9, the nuts 3 on said tie-rod being outside of said links. The sleeve 4 on the middle tie-rod 2 extends between the side pieces, and the nuts 3 on said tie-rod bear against said side pieces on the outside. There are two spacer sleeves 4 on the forward tie-rod 2, such sleeves being between the side pieces and the ends of the braces through which said tie-rod passes, and there is a second pair of links 9 on this tie-rod, with a pair of nuts 3, the same as at the rear end of the body. A link 10, which is provided with an upwardly and forwardly extending operating arm 11, is mounted on the foremost tie-rod 2, between the front ends of the braces 6. Thus a very rigid structure is produced, and the platform, which will be described presently, is equally rigid.

The rear end of the truck is supported on the wheels 8, and the front end of said truck is supported on and guided or steered by a third roll or wheel 8 that is mounted on a short shaft or rod 12 carried by a swivel hanger 13 under the center of the front plate 5, such hanger being pivoted at 14 to said plate, as shown in Fig. 2. The hanger 13 has a pair of forwardly extending arms 15, between which is received one end of a tongue 16, and to which such tongue is pivoted at 17.

Pivotally mounted at 18, in an inverted U-shaped bracket 19 on the plate 5, is a latch 20 having its hook at the rear terminal and directed downwardly and forwardly, and its forward terminal extending in front of said bracket. The bracket 19 is securely attached to the top of the plate 5. The latch 20 is the member that holds the platform in its raised position, when said platform is released by the tongue 16 and intervening parts yet to be described.

Preferably the tongue 16 is provided with extensible or lengthening means, in order that the leverage and consequent power of the same may be increased when occasion demands. To this end a longitudinal slot 21 is made in the upper or rear side (according to the position of the tongue), and an auxiliary arm 22 is located in such slot and pivoted at 23 to the sides thereof, the pivot passing through a longitudinal slot 24 in said arm adjacent to an end thereof. The arm 22 when not in use is permitted to remain wholly in the slot 21, as shown in Fig. 3 and by dotted lines in Fig. 4, or it may hang from the pivot 23, as shown in Fig. 1, but, when it is desired to use said arm to increase the length and power of the tongue 16, said arm is turned on said pivot into the position shown by full lines in Fig. 4. When in this last-noted position, with the pivot 23 in the forward end of the slot 24, the arm 22 is locked against oscillation on said pivot, so that the length and efficiency of the tongue 16 are increased by the added length of that part of said arm which extends beyond said tongue. By moving the arm 22 outwardly in the slot 21, until the rear end of the slot 24 contacts with the pivot 23, the added length is still more, but said arm can then be employed only for a downward pressure, and would not afford so good a control of the tongue as in the other case. The arm 22 must, of course, be drawn forward before it can be swung over into the slot 21. An opening 25 is provided in the free end of the arm 22 for the insertion of a rod or handle, if desired. A handle rod 26 projects from each side of the tongue 16 adjacent to the free terminal thereof.

The tongue 16 is provided with a top or rear-side transverse shoulder 27, which is located a short distance from the pivot 17, and an upwardly or rearwardly-extending equalizer link 28 is pivoted at 29 to said tongue adjacent to said shoulder—see Fig. 5. The arrangement of parts is such that the shoulder 27 limits the movement of the link 28, on the pivot 29, toward the pivoted end of the tongue.

The platform consists of a pair of side pieces 30 that are adapted to rest on the side pieces 1 when said platform is depressed, a rear tie-bar 31 rigidly connecting the back ends of said first-mentioned side pieces, a front plate 35 which is somewhat elevated and has its ends rigidly attached to the side pieces 30, three tie-rods with their nuts and spacer sleeves, and a pair of braces, said tie-rods, nuts, sleeves, and braces being similar to corresponding parts used in the construction of the body and being respectively designated by the numerals 32, 33, 34 and 36. The upper ends of the rear links 9 are connected with the rear tie-bar 32, between the side pieces 30 and the nuts 33 on said tie-bar, the front links 9 are similarly connected at their upper ends with the forward tie-bar 32, and the link 10, which is the direct actuating link member for the platform, is connected at its upper end with said forward tie-bar, between adjacent or contiguous terminals of the braces 36. The spacer sleeve 34 on the back tie-bar 32 extends the entire distance between the side pieces 30. A starting spring 37 is attached at its front end to the middle tie-bar 32, and at its back end to the back tie-bar 2 or the sleeve 4 thereon. There are two sleeves 34 on the middle tie-bar 32, each between one of the side pieces 30 and the end of the spring 37 that is attached to said tie bar. The arrangement of sleeves, etc. on the front tie-bar 32 is the same as that of corresponding parts on the front tie-bar 2 below. Two lugs or guides 38 are secured to the side pieces 30 and extend downward inside of the side pieces 1, to assist in holding the platform against lateral movement, and the front ends of said side pieces 30 are extended forward beyond the rear edges of the vertical parts of the plate 5 for the same purpose. The guides 38 are never out of engagement or operative relation with the side pieces 1, and the side pieces 30 are never out of engagement or operative relation with the vertical parts of the plates 5. The plate 35 has a slot 39 therein for the arm 11, and a latch-hook opening 40, and is provided with a rear-edge flange 41 to serve as an abutment for the front of the load at the base.

When the platform is in its low position and resting directly on the body or on the side pieces 1, the links 9 and 10 incline rearwardly from their lower ends, and said links are never brought quite up into vertical position, the arm 11 striking the front end of the slot 39 before said last-mentioned position is or can be reached. A connecting member such as a chain 42 extends between the arm 11 and the adjacent end of the link 28, and the proportions of parts are such that, when the platform is down and said arm consequently standing practically in an upright position, the line of draft between the top of said arm and the pivot 29 is direct, said link then being out of contact with the shoulder 27, as shown in Fig. 1, but that, when said platform is elevated, such line of draft through the intervening mechanical part is indirect or in reality two lines which form approximately a right-angle with each other, as shown in Fig. 2. This change is produced or begins to be produced when the shoulder 27 encounters the link 28, as the tongue 16 is swung forwardly and downwardly on the pivot 17, and so takes said link out of line with the chain 42, said link fulcruming on said shoulder. At the beginning of the forwardly and downwardly swinging or lifting stroke of the tongue 16, therefore, the draft is direct and most powerful, but the movement is very slow, as should be the case in order to start the platform forward and upward on the links 9, the latter turning on their tie-bar axes, through the medium of the link 28, the chain 42, and the arm 11 and link 10 the latter also turning on its tie-rod axis, then, as the shoulder 27 contacts with said link 28 and causes the latter to begin to describe at the rear or upper end an arc of a circle, the movement is accelerated in compensation for the decrease in lifting or propelling force required to carry said platform to its high position, such force continuing to decrease and the speed to increase until such high position is reached. Without this equalizing provision, or the straight or approximately straight initial draft which changes to an indirect or angular draft, too much power would be needed to start the load, or too much lever movement would be required and the movement of the load would be more moderate than it should be for practical purposes. The same rule applies to the lowering of the load, only inversely, that is to say, the load, under the control of the tongue 16, moves comparatively quickly at the start, the speed decreasing and the power increasing, however, as the link 28 travels upwardly and rearwardly, until the shoulder 27 leaves said link and the draft is straight, when the maximum power is in control and this at the time that it is most needed, which is as the links 9 rock into their rearmost positions and the platform settles down onto the body. The object of the spring 38 is to assist in retracting the platform to start the load downward, in the event such assistance is required.

When the platform is actuated forward and upward in the manner above described, the plate 35 rides under the hook of the latch 20 and said hook enters the opening 40, then, upon easing up on the tongue 16, said platform settles back until caught and held by the now engaging parts of said plate and latch. To release the platform, thus locked in its elevated position by the latch 20, it is simply necessary to bear down on the tongue 16 to force said platform forward a little, and then to actuate said latch out of engagement with the plate 35, the forward terminal of said latch being generally utilized for the purpose of rocking the latch on the pivot 18 until the latch hook clears said plate. The platform is now ready to descend under the influence of the spring 37 and the load and controlled by the tongue. The platform is actuated forward against the resiliency of the spring.

This construction provides for a very low down truck in its load-receiving part. Then, again, any load which the truck is adapted for can be raised and lowered with sufficient speed and comparative ease.

The pile or stack of goods or material to be handled with my truck is supported from the floor at a sufficient height to enable said truck to be run under the same when the platform is depressed, and usually portable benches are provided to support such goods or material, such benches being raised, transported, and set down again with the goods or material on them during the entire operation.

Briefly the operation of the truck as a whole is described as follows: The truck, with the tongue 16 down as a rule, is hauled to the vicinity of the load to be moved and backed up to the same, then said tongue and the latch 20 are manipulated to release and lower the platform, and the truck is backed beneath the load, entering between the side supports for said load, the same being the side supports of the bench when the latter is used. Next the tongue 16 is forced forward and downward to raise the load, which includes the bench when present, from the floor on or with the platform, through the medium of the link 10 and intervening parts, and the links 9, and the platform is released to the latch 20. The tongue 16 is now free to be swung on the pivot 17, and to turn the hanger 13 on the pivot 14, in the latter operation the chain 42 swinging with said tongue and the link 28, with the forward end of the arm 11 as a center, without interfering with such operation or with the tongue, because said end of said arm is over said pivot 14. The load is hauled to the desired locality, being steered without difficulty on the way, and then deposited by depressing the tongue to release the latch, disengaging said latch from the plate 35, and slowly swinging said tongue upwardly and backwardly, which results in the lowering of the platform and so permitting the bench to descend to the floor, or the load without the bench, in the absence of the latter, to descend onto other supporting means. Finally the truck is drawn from beneath the load and out of the way.

When the mechanism is operated to elevate the load and the platform comes into contact with the under surface of the load, there is usually so much frictional resistance that said platform is held stationary while the body of the truck moves backward on the wheels 8, but the desired result of elevating the platform and carrying the load up with it is attained just the same as though the body were held stationary and the platform were moved forwardly as well as upwardly.

At 43 and 44, respectively, are represented rivets and spacer washers for either pair of braces (6 or 36). The braces 6 and 36 afford powerful supporting, strengthening, and stiffening means for the two tie-rods with which the link 10 is connected and through the medium of which much of the work of raising and lowering is done.

A lug 45 may be provided on the upper or back side of the tongue 16 and positioned to contact with the front edge of the plate 5, when said tongue is thrown upwardly and rearwardly, to limit such movement on the part of the tongue.

What I claim as my invention, and desire to secure by Letters Patent, is—

1. The combination, in a truck, of a body, a superimposed platform, links connecting said body and platform, an operating arm-provided link independent of said first-mentioned links, means operatively to connect opposite ends of said arm-provided link with said body and platform at points that are back of their front ends, a tongue pivotally connected with said body, and permanent connections between the arm of said arm-provided link and said tongue.

2. The combination, in a truck, of a body, a superimposed platform, links connecting said body and platform, an operating arm-provided link independent of said first-mentioned links, means operatively to connect opposite ends of said arm-provided link with said body and platform at points that are back of their front ends, a tongue pivotally connected with said body, permanent connections between the arm of said arm-provided link and said tongue, and locking means to hold said platform in its elevated position, and to release the same.

3. The combination, in a truck, a body and a superimposed link connected platform, said body and platform having attaching members for a link back of their front ends, an operating arm-provided link connecting said attaching members, a tongue pivotally connected with said body, a link pivoted to said tongue, and connecting means between said last mentioned link and the arm of said first mentioned link connection.

4. The combination, in a truck, of a body and a superimposed link connected platform, such body and platform having attaching members back of their front ends for a link, an operating arm-provided link connecting said attaching members, a tongue pivotally connected with said body and provided with a shoulder, a link pivoted to said tongue in operative position relative to said shoulder, and connecting means between said last mentioned link and the arm of said first mentioned link.

5. The combination, in a truck, of a body and a superimposed link connected platform provided with transverse members, which extends from side to side of said body and platform, an intermediate operating link connected with said members obliquely arranged, braces between the sides of said body and platform and said members, and operating means for said link.

6. The combination, in a truck, with relatively movable upper and under sections, of a slotted tongue pivotally connected with one of said sections, an arm pivotally attached to said tongue and adapted to lie in said slot below or back of the free end of said tongue, and to be turned outwardly to project beyond said free end of said tongue, and means to actuate one of said sections relative to the other through the medium of said tongue.

7. The combination, in a truck, with relatively movable upper and under sections, of a tongue pivotally connected with one of such sections, an arm pivotally attached to said tongue and adapted to be disposed below or back of the free end thereof, and to be turned outwardly to project beyond said free end, means to retain said arm in rigid connection with said tongue, when the former is turned outwardly, and means to actuate one of said sections relative to the other through the medium of said tongue.

ENOCH WHALLEY.

Witnesses:
A. C. FAIRBANKS,
F. A. CUTTER.